(12) United States Patent
Sano (10) Patent No.: US 10,220,683 B2
(45) Date of Patent: Mar. 5, 2019

(54) WIND DIRECTION ADJUSTER

(71) Applicant: NIHON PLAST CO., LTD., Shizuoka (JP)

(72) Inventor: Toru Sano, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 15/238,974

(22) Filed: Aug. 17, 2016

(65) Prior Publication Data

US 2017/0057328 A1    Mar. 2, 2017

(30) Foreign Application Priority Data

Aug. 25, 2015 (JP) ................. 2015-166077

(51) Int. Cl.
B60H 1/34 (2006.01)

(52) U.S. Cl.
CPC ... B60H 1/3442 (2013.01); *B60H 2001/3478* (2013.01)

(58) Field of Classification Search
CPC .................................................. B60H 1/3442
USPC ........................................................ 454/154
See application file for complete search history.

(56) References Cited

U.S. PATENT DOCUMENTS

| 2011/0250830 A1* | 10/2011 | Steinbeiss | B60H 1/3442 454/154 |
| 2013/0210333 A1* | 8/2013 | Kober | B60H 1/3442 454/154 |
| 2015/0202946 A1* | 7/2015 | Inagaki | B60H 1/3428 454/154 |

FOREIGN PATENT DOCUMENTS

JP        2014-091377 A       5/2014

* cited by examiner

*Primary Examiner* — Steven B McAllister
*Assistant Examiner* — Allen Schult
(74) *Attorney, Agent, or Firm* — Brundidge & Stanger, P.C.

(57) ABSTRACT

A wind direction adjuster enabling an operation of a louver with a stable operation load and providing an excellent operation feeling is provided. An axial support body is axially supported to a cylindrical case body turnably so as to have an axis along a direction crossing an axial direction of the case body. A louver is axially supported to the axial support body turnably so as to have an axis along a direction crossing the axis of the axial support body. A ball unit is set in any one of the case body and the louver as a load setting unit that sets a turning load of the louver. A receiving unit that slidably receives the ball unit is set in the other one of the case body and the louver. A coil spring urges one of the ball unit and the receiving unit to be pressed against the other.

2 Claims, 7 Drawing Sheets

WIND DIRECTION ADJUSTER

CROSS REFERENCE TO RELATED APPLICATION

This application is entitled to the benefit of Japanese Patent Application No. 2015-166077 filed on Aug. 25, 2015, the disclosure of which including the specification, drawings and abstract is incorporated herein by reference in its entirety.

TECHNICAL FIELD

The present invention relates to a wind direction adjuster provided with a louver axially supported to a cylindrical case body turnably in any given direction.

BACKGROUND ART

Wind direction adjusters each disposed at a wind outlet for blowing air in an air conditioner used in a vehicle such as an automobile is called an air conditioning blower, an air outlet, a ventilator or a register, for example. Such a wind direction adjuster is installed at each part of a vehicle such as an instrument panel or a center console and makes a contribution to improving the cooling and heating comfort performance.

There is a known configuration for such a wind direction adjuster, in which the wind direction adjuster includes a cylindrical louver inside a case body formed in a cylindrical shape, for example, and the wind direction is adjusted by tilting the louver in any given direction inside the case body. This configuration includes a ball unit as a turning unit at a distal end of a shaft body provided on the central axis of the case body, and a receiving unit that receives the ball unit is provided on the central axis of the louver while a load adding member composed of a rubber elastic body is interposed between the ball unit and the receiving unit, whereby an operation load (torque) and operation feeling are controlled (see, e.g. Japanese Patent Application Laid-Open No. 2014-91377 (pages 5 and 6, and FIG. 4)).

SUMMARY OF INVENTION

Technical Problem

However, since the above-described wind direction adjuster is configured such that the operation load or the like is controlled by the load adding member, unless the spherical accuracy of the ball unit and the thickness of the load adding member are identical on the entire surface, it is difficult to make each directional operation feeling uniform. Furthermore, additional handling is required to cope with a change in the characteristic due to a temperature of the load adding member or deterioration of operation feeling caused by wear of the load adding member when the number of operations increases.

The present invention has been implemented in view of such points, and an object of the present invention is to provide a wind direction adjuster enabling an operation of a louver with a stable operation load, and providing an excellent operation feeling.

Solution to Problem

A wind direction adjuster according to a first aspect includes: a cylindrical case body; an axial support body axially supported to the case body turnably so as to have an axis along a direction crossing an axial direction of the case body; a louver axially supported to the axial support body turnably so as to have an axis along a direction crossing the axis; and a load setting unit that sets a turning load of the louver. In the wind direction adjuster, the load setting unit includes: a turning unit provided in any one of the case body and the louver, a receiving unit provided in the other one of the case body and the louver and configured to slidably receive the turning unit, and an urging unit configured to urge any one of the turning unit and the receiving unit to be pressed against the other.

The wind direction adjuster according to a second aspect is the wind direction adjuster according to the first aspect, in which in at least any one of the turning unit and the receiving unit, a position where the turning unit and the receiving unit slide over each other is formed using an elastic body.

Advantageous Effects of Invention

The wind direction adjuster according to the first aspect includes a load setting unit including: a turning unit provided in one of a case body and a louver; a receiving unit provided on the other one of the case body and the louver; and an urging unit configured to press one of the turning unit and the receiving unit against the other one. The sliding resistance between the turning unit serving as the turning load of the louver and the receiving unit can be appropriately set by the urging unit, so that it is possible to operate the louver with a substantially constant and stable operation load regardless of the dimensional accuracy of the turning unit and/or the receiving unit, the temperature, and/or the number of operations or the like, and thus to provide an excellent operation feeling.

The wind direction adjuster according to the second aspect, in the wind direction adjuster, a position of at least one of the turning unit and the receiving unit that slides over each other is formed of an elastic body, so that, in addition to the effects brought about by the wind direction adjuster according to the first aspect, it is possible to further stabilize the sliding resistance between the turning unit serving as a turning load of the louver and the receiving unit and thus to operate the louver with a more stable operation load.

DESCRIPTION OF EMBODIMENTS

Hereinafter, a wind direction adjuster according to a first embodiment of the present invention will be described with reference to the accompanying drawings.

Figure 4:
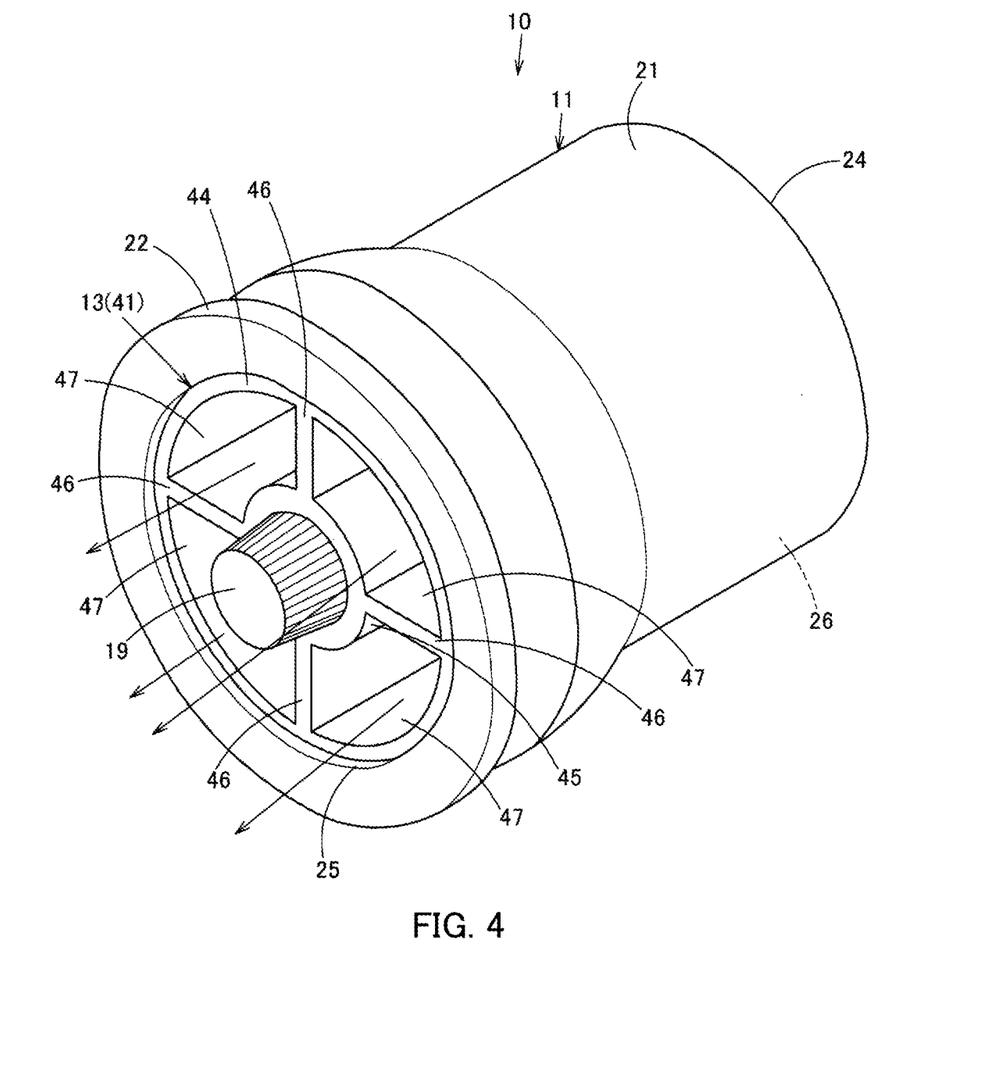
FIG. 4 is a perspective view of the wind direction adjuster.

In FIG. 4, reference numeral 10 denotes a wind direction adjuster and wind direction adjuster 10 is used for air conditioning to adjust a direction of air from an air conditioner provided in a vehicle such as an automobile, for example, i.e., to adjust a wind direction and is installed at an installation target unit such as an interior member of an automobile, including an instrument panel, a center console, an overhead console, a center pillar and a door trim, for example, although they are not illustrated. In this embodiment, wind direction adjuster 10 is formed in a round shape.

Figure 2:
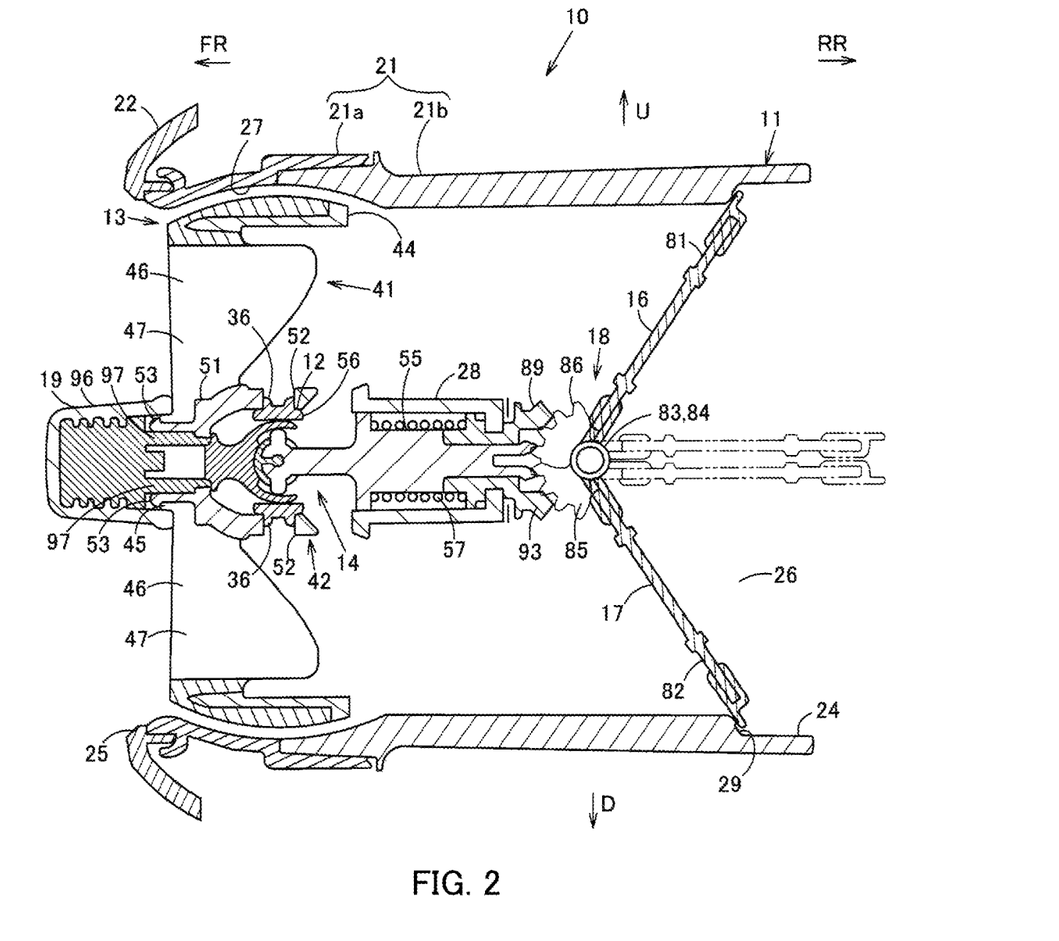
FIG. 2 is a cross-sectional view of the wind direction adjuster.

Wind direction adjuster 10 is also called an air outlet, a ventilator, a register or the like, and as illustrated in FIG. 2, includes: case body 11; axial support body 12 axially supported to case body 11 turnably; louver 13 axially supported to axial support body 12 turnably; and load setting unit 14 that sets a turning load (torque) of louver 13 with respect to case body 11.

Figure 5:
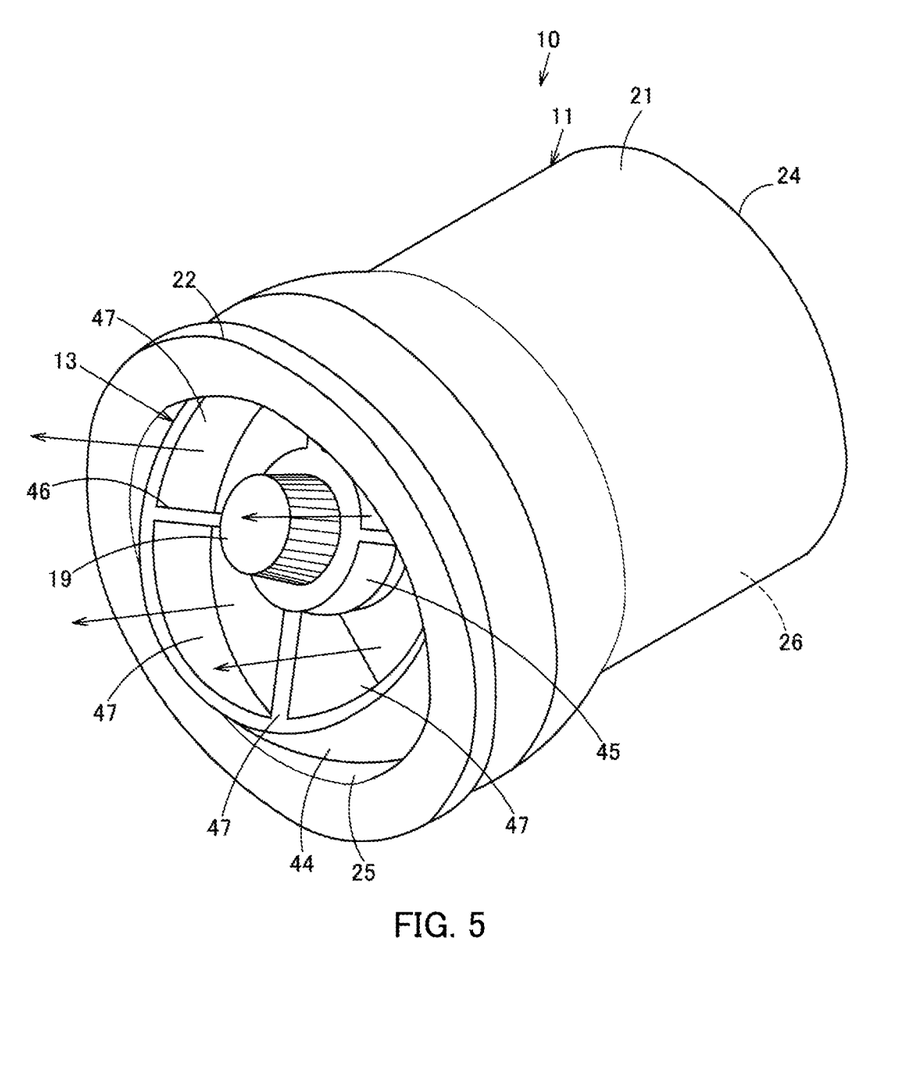
FIG. 5 is a perspective view illustrating the wind direction adjuster with a louver of the wind direction adjuster turned in one direction.
Figure 6:
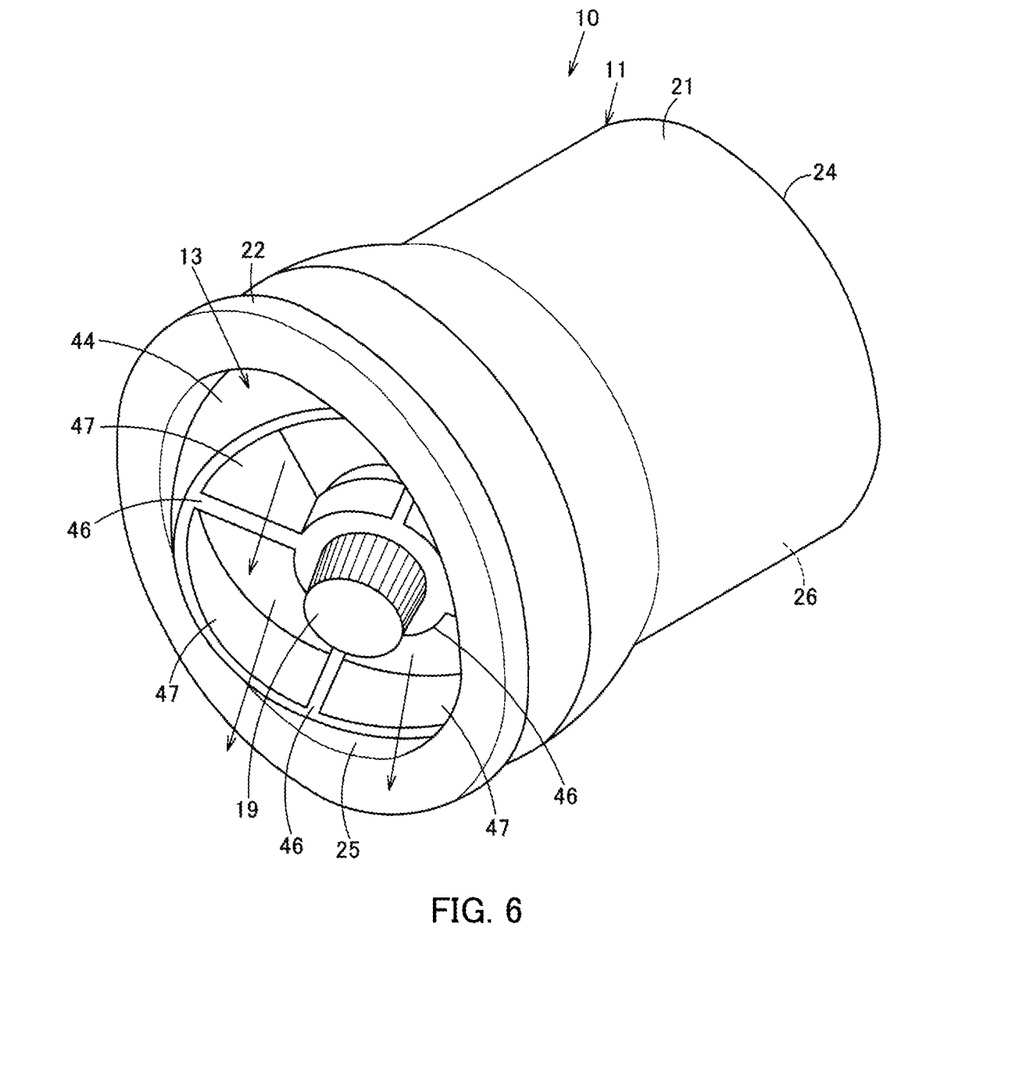
FIG. 6 is a perspective view illustrating the wind direction adjuster with the louver turned in another direction crossing the one direction in FIG. 5.

Wind direction adjuster 10 includes a support structure in which an operation of operation knob 19 in the up, down, left and right directions by holding operation knob 19 makes it to possible to turn louver 13 in the up, down, left and right directions according to the operation as illustrated in FIGS. 5 and 6.

Figure 1:
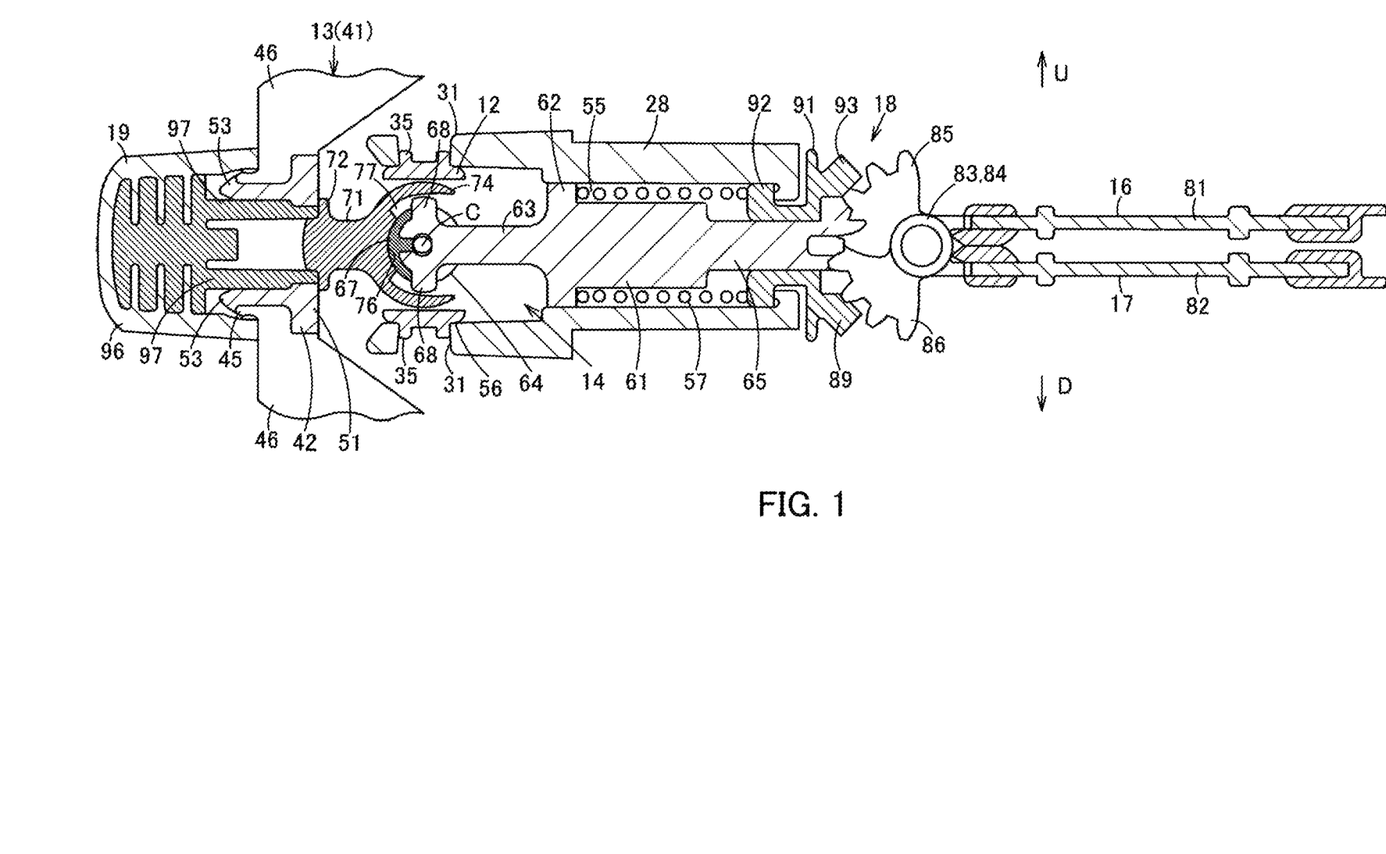
FIG. 1 is a partial cross-sectional view of a wind direction adjuster according to a first embodiment of the present invention.

In summary, as illustrated in FIG. 1, louver 13 is configured to be turnable in any direction around turning center C by turning of axial support body 12 with respect to bearing unit 28 of case body 11 and turning of louver bearing unit 42 with respect to axial support body 12. In addition, load setting unit 14 is provided so that an operation load is kept in a substantially constant state during turning of louver 13.

As illustrated in FIG. 1, load setting unit 14 includes: ball unit 64 (corresponding to a turning unit); receiving unit 74 that slidably receives ball unit 64; and coil spring 57 (corresponding to an urging unit). Load setting unit 14 is configured to appropriately set sliding resistance between ball unit 64 and receiving unit 74 by causing coil spring 57 to urge ball unit 64 toward receiving unit 74 to make the turning load of louver 13 substantially constant.

Wind direction adjuster 10 may include: (one and the other) valves 16 and 17 that open and close the interior of case body 11 as (one and the other) opening and closing bodies (valve bodies); and drive unit 18 that opens and closes valves 16 and 17. Wind direction adjuster 10 may also include operation knob 19 as an operation unit to operate louver 13 and valves 16 and 17. Wind direction adjuster 10 may be formed of, for example, a synthetic resin.

Hereinafter, a configuration of wind direction adjuster 10 according to the present embodiment will be described in detail.

Case body 11 includes, as separate bodies, main case body 21 and finisher 22 which is an outer member serving as a design unit to be engaged with case body 21. Case body 11 includes: circular inlet 24 serving as an inlet to receive wind from an air conditioner or the like on one end side (case body 21 side); and circular exposure aperture 25 which communicates with inlet 24 and through which louver 13 is exposed on the other end side (finisher 22 side), thereby forming channel 26 which communicates between inlet 24 and exposure aperture 25 to allow wind to pass through channel 26. In addition, louver housing portion 27 is provided on the front side, which is the side of exposure aperture 25, in a spherical shape by expand a diameter in case body 11, and louver 13 is positioned inward of louver housing portion 27. Furthermore, bearing unit 28 is provided inside case body 11 along a central axis of case body 11. Valve receiving portion 29 serving as a valve body receiving portion that receives valves 16 and 17 may also be provided inside case body 11.

Note that, a description will be given hereinafter assuming that the downstream side of the wind passing through channel 26 in case body 21 from the side of inlet 24 to the side of exposure aperture 25 is a front side (arrow FR side), the upstream side thereof is a rear side (arrow RR side), the direction orthogonal to the front-rear direction (arrow FR and RR directions) is a horizontal direction or left-right direction which is a width direction, and the direction orthogonal to the front-rear direction or left-right direction is a upward-downward direction (arrow U and D directions). The positions of the respective components of wind direction adjuster 10 will be described assuming the state in which valves 16 and 17 are made fully open (FIG. 1) as a reference.

Case body 21 is provided with louver housing portion 27, bearing unit 28 and valve receiving portion 29. Case body 21 may be divided into front and rear case members 21a and 21b.

Furthermore, finisher 22 forms a part of the design surface of the mounting position of wind direction adjuster 10 and is formed in a cylindrical shape and fittingly attached to the front-end portion of case body 21.

Note that, the circumferential direction of case body 11 will be referred to as a direction along an arc centered on a central axis of case body 11, which is on a plane orthogonal to the central axis, that is, a direction along an outer circumference of exposure aperture 25.

Figure 3:
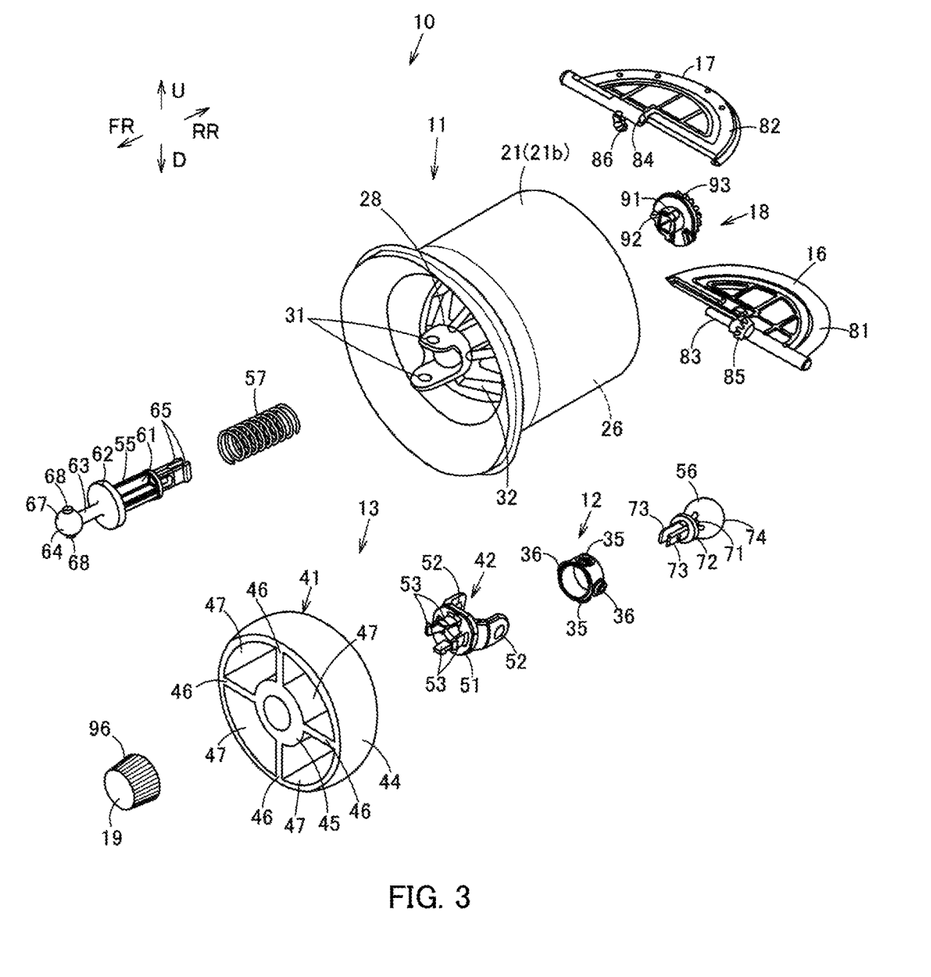
FIG. 3 is a partial exploded perspective view of the wind direction adjuster.

Bearing unit 28 is used for axially supporting axial support body 12 turnably. As illustrated in FIG. 3, bearing unit 28 is provided in a longitudinal cylindrical shape along the axial direction of case body 11 and provided with protruding bearings 31 to axially support axial support body 12. These bearings 31 are spaced apart from each other in the up-down direction. Therefore, the axial support body 12 is axially supported to case body 11 turnably so as to include an axis in the up-down direction crossing (orthogonal to) the central axis of case body 11. Bearing unit 28 is coupled with the inner circumference of case body 11 (case body 21) via a plurality of coupling portions 32. Coupling portions 32 are radially provided along the diameter direction of case body 11 (case body 21).

Referring back to FIG. 2, valve receiving portion 29 is provided in a stepped shape on the inner circumferential portion closer to a rear side of case body 11 (case body 21). This valve receiving portion 29 is provided while extending in the circumferential direction of case body 11 (case body 21).

Axial support body 12 is also called a "joint" or the like, and is formed in a substantially cylindrical shape. As illustrated in FIG. 3, axial support body 12 is provided with first turning shafts 35 and second turning shafts 36 along a direction crossing (orthogonal to) first turning shafts 35 so as to protrude outward respectively. First turning shafts 35 are axially supported to bearings 31 of bearing unit 28 turnably. Second turning shafts 36 axially support louver 13 turnably. Therefore, louver 13 is axially supported to axial support body 12 so as to have an axis in the direction crossing (orthogonal to) the axis of axial support body 12 with respect to case body 11.

Louver 13 is also called a "blade body," "housing" or "fin" or the like and is used to control the direction of wind that is blown from wind direction adjuster 10. Louver 13 is provided with louver main body 41 and louver bearing unit 42 that axially supports louver main body 41 to axial support body 12. Although louver main body 41 and louver bearing unit 42 are provided as separate bodies in the present embodiment, they may also be integrally provided as a single unit.

Louver main body 41 is integrally provided with cylindrical outer portion 44, mounting portion 45 disposed inside and coaxially with outer portion 44, and a plurality of blades 46 that couple outer portion 44 with mounting portion 45. Fan-shaped portions surrounded by outer portion 44, mounting portion 45 and blade 46 constitute ventilation openings 47.

The outer circumferential surface of outer portion 44 is formed in a spherical shape and the outer circumferential surface is spaced apart from louver housing portion 27 via a tiny gap at a position opposite to louver housing portion 27 of case body 11.

Mounting portion 45 is a portion to which louver bearing unit 42 and operation knob 19 are attached and has a cylindrical shape having a smaller diameter than outer portion 44.

Blades 46 are provided radially along the diameter direction of louver main body 41 (louver 13) and are spaced apart from one another at substantially equal intervals in the circumferential direction.

Louver bearing unit 42 includes: ring-shaped louver bearing unit main body 51, louver bearings 52 provided so as to protrude on the rear side from louver bearing unit main body 51; and a plurality of claw-like bearing engagement portions 53 provided so as to protrude on the front side from louver bearing unit main body 51. Bearing engagement portions 53 are inserted into louver main body 41 (mounting portion 45) from the rear side while bearing engagement portions 53 are locked to the front side of louver main body 41 (mounting portion 45), so that louver bearing unit 42 is integrally attached to louver main body 41.

Louver bearings 52 are portions to be axially supported to axial support body 12 turnably by second turning shafts 36 of axial support body 12.

Load setting unit 14 is interposed between case body 11 and louver 13 and includes: shaft 55 which is a shaft body serving as a ball unit setting body; receiving body 56 serving as a receiving unit setting body that receives shaft 55; and coil spring 57 serving as an urging unit that urges shaft 55 toward receiving body 56.

Shaft 55 is formed in a longitudinal shape, inserted through bearing unit 28 and held in case body 11. Therefore, shaft 55 is disposed along the central axis of case body 11. Shaft 55 integrally includes: shaft main body 61 serving as a shaft main body; spring receiving unit 62 serving as an urging unit receiving unit that protrudes from the front side which is one end side of shaft main body 61 in a flange shape; protruding portion 63 that protrudes coaxially with shaft main body 61 from spring receiving unit 62 toward the front side which is opposite to shaft main body 61; ball unit 64 which is a sliding portion serving as a turning unit provided on a side opposite to the distal end side of protruding portion 63, that is, a side opposite to spring receiving unit 62; and locking portion 65 that protrudes from the rear side which is the other end side of shaft main body 61. Spring receiving unit 62 is pressed along the central axis of case body 11 from the rear to the front direction by coil spring 57, so that shaft 55 is urged toward receiving body 56 (louver 13) (FIG. 1).

Shaft main body 61 is formed of ribs or the like arranged in a cross shape, for example. Shaft main body 61 is located inside bearing unit 28.

Spring receiving unit 62 is a portion in contact with the front-end portion of coil spring 57 at the rear portion thereof.

Spring receiving unit 62 is located inside bearing unit 28, for example. Spring receiving unit 62 is formed in a disc-like shape, for example.

Protruding portion 63 is formed in a columnar shape which is thinner than shaft main body 61. The front-end side of protruding portion 63 protrudes from bearing unit 28 toward the front side and protruding portion 63 is inserted into louver bearing unit 42 of axial support body 12 and louver 13.

As illustrated in FIG. 1, ball unit 64 is formed in a spherical shape having a diameter greater than the diameter of protruding portion 63 at the distal end of protruding portion 63. Ball unit 64 is disposed such that the center thereof is substantially located on the central axis of shaft main body 61 and protruding portion 63, that is, on the central axis of case body 11. Ball unit 64 is slidably (turnably) received by receiving body 56. Shaft 55 is urged by coil spring 57 and ball unit 64 is thereby pressed so as to be urged against receiving body 56. The surface of ball unit 64 is covered by elastic body 67. As elastic body 67, a material having a counterforce such as elastomer or silicone rubber or the like is preferable. Ball unit 64 is provided with protruding stoppers 68. Stoppers 68 protrude from elastic body 67 in the diameter direction of ball unit 64 and are formed in a substantially columnar shape and located on mutually opposite directions with respect to the center of ball unit 64.

Locking portions 65 are each a portion that couples shaft 55 with drive unit 18. A plurality of locking portions 65 protrude backward from the rear end of shaft main body 61, and a distal end side thereof protrudes backward from bearing unit 28. The distal end side of each locking portion 65 is formed in a claw-like shape and locking portions 65 are locked to drive unit 18.

Receiving body 56 can also be called a "torque receiving spacer," and is inserted through axial support body 12, coupled with operation knob 19 and disposed along the central axis of case body 11. That is, receiving body 56 is disposed coaxially with shaft 55 (ball unit 64). Receiving body 56 integrally includes: substantially columnar receiving main body 71; positioning portion 72 that protrudes in a flange shape from a front side which is one end side of receiving main body 71; locking body portion 73 that protrudes from positioning portion 72 coaxially with receiving main body 71 toward a front side which is a side opposite to receiving main body 71; and receiving unit 74 that protrudes on a rear side which is the other end side of receiving main body 71 and receives ball unit 64 of shaft 55. Receiving body 56 is disposed with receiving unit 74 being located inside axial support body 12.

Positioning portion 72 is brought into contact with the rear side of louver 13 (louver bearing unit 42) with locking body portion 73 being inserted through louver 13 (louver bearing unit 42 and mounting portion 45) to thereby locate receiving body 56 with respect to louver 13 in the front-rear direction (axial direction of case body 11).

Locking body portion 73 is inserted into louver 13 (louver bearing unit 42 and mounting portion 45) from the rear and the front-end side is inserted into and locked to operation knob 19.

Receiving unit 74 is open backward, that is, toward the shaft 55 (ball unit 64) side. Receiving unit 74 is formed in a shape of a sphere having a larger diameter than ball unit 64 (elastic body 67), that is, a sphere which is offset outward. Receiving unit 74 is formed so as to be coaxial with first turning shafts 35 and second turning shafts 36 of axial support body 12, in other words, along the spherical surface centered on a position where the axis of first turning shafts 35 and the axis of second turning shafts 36 cross each other. Therefore, the center position of receiving unit 74 substantially coincides with the center position of ball unit 64, which constitutes turning center C of louver 13. Spherical sliding surface 76 that slides with elastic body 67 on the surface of ball unit 64 is formed inside receiving unit 74. Sliding surface 76 is provided on a front-end portion inside receiving unit 74, that is, at a position facing the vicinity of the front-end of ball unit 64 (elastic body 67), offset closer to the center side (turning center C side) than the inner circumferential surface of receiving unit 74, forming a concave curved surface having substantially the same diameter as the surface of ball unit 64. For this reason, regulating surface 77 is formed in a stepped shape around sliding surface 76, which is a regulating portion that regulates the turning angle of louver 13 with respect to case body 11 by stoppers 68 provided so as to protrude from ball unit 64 coming into contact with sliding surface 76.

Coil spring 57 can also be called a "torque adjusting body" which is used to set a turning load (torque) when louver 13 is caused to turn with respect to case body 11 by setting an urging force of ball unit 64 (elastic body 67) against receiving unit 74 according to a pressing force of coil spring 57. In bearing unit 28, coil spring 57 is interposed between drive unit 18 (or bearing unit 28) and shaft 55 (spring receiving unit 62).

Valves 16 and 17 are used to control the amount of air blowing from wind direction adjuster 10 by controlling the amount of opening and closing of channel 26. Valves 16 and 17 are provided with valve main bodies 81 and 82 as (one and the other) opening and closing main bodies (valve main bodies), (one and the other) shaft portions 83 and 84 that axially support valves 16 and 17 turnably and (one and the other) gear portions 85 and 86 forming a part of drive unit 18.

Valve main bodies 81 and 82 are formed in a shape corresponding to an inner surface of case body 11 (case body 21) or a semicircular shape in the present embodiment, with valve body 81 configured to open and close a substantially upper half portion of channel 26 and valve body 82 configured to open and close a substantially lower half portion of channel 26.

Shaft portions 83 and 84 are coaxially coupled together along the direction crossing (orthogonal to) the axial direction of case body 11 and axially supported to case body 11 (case body 21) turnably. Shaft portions 83 and 84 are located at the front-end portion of valve main bodies 81 and 82. With shaft portions 83 and 84 coupled together, valve main bodies 81 and 82 are placed so as to face each other at opposite positions across the central axis of case body 11.

Gear portions 85 and 86 are each formed in a fan shape and attached coaxially with shaft portions 83 and 84. Gear portions 85 and 86 are arranged at positions shifted from each other in the circumferential direction of shaft portions 83 and 84.

Drive unit 18 is composed of gear portions 85 and 86 provided for valves 16 and 17, valve gear 89 that engages with gear portions 85 and 86 as a turning drive unit (turning gear). Valve gear 89 is coupled with shaft 55 and configured to turn in the circumferential direction in conjunction with operation of operation knob 19 to cause the rear side of valves 16 and 17 (valve main bodies 81 and 82) to turn up and down via gear portions 85 and 86 around shaft portions 83 and 84. Valve gear 89 is attached at the rear of bearing unit 28 and disposed coaxially with case body 11. Valve gear 89 integrally includes annular-shaped main body portion 91, connection portion 92 that protrudes toward the front side from main body portion 91 and gear tooth portion 93 that protrudes rearward from main body portion 91.

Main body portion 91 is located at the rear of bearing unit 28 and locking portion 65 of shaft 55 is inserted (press-fitted) into main body portion 91 from the front side. Locking portion 65 engages with the rear side of main body portion 91, and valve gear 89 and shaft 55 are thereby locked and fixed to each other.

Connection portion 92 is located inside bearing unit 28, outwardly regulated by locking portion 65 of shaft 55 inserted through main body portion 91 and thereby engaged with the rear end portion in bearing unit 28. The rear end portion of coil spring 57 is placed in contact with the front side of connection portion 92. That is, coil spring 57 is interposed between valve gear 89 (connection portion 92) and shaft 55 (spring receiving unit 62). Therefore, gear tooth portion 93 of valve gear 89 is pressed against gear portions 85 and 86 by the urging force of coil spring 57.

Gear tooth portion 93 is a portion that meshes with gear portions 85 and 86. Gear tooth portion 93 meshes with gear portions 85 and 86 and is configured to cause valves 16 and 17 to turn upward or downward around shaft portions 83 and 84 when valve gear 89 is turned in the circumferential direction.

Operation knob 19 is attached to louver 13 turnably in the circumferential direction, and moving operation knob 19 in the up-down and left-right directions causes louver 13 to turn and turning operation knob 19 in the circumferential direction with respect to louver 13 causes valves 16 and 17 to open and close via drive unit 18. Operation knob 19 integrally includes substantially cylindrical knob main body 96 that is exposed to the front side of louver 13 and locking portion 97 that protrudes on the rear side of knob main body 96. Locking body portion 73 of receiving body 56 inserted into louver 13 from the rear side is locked to knob main body 96, operation knob 19 and receiving body 56 are integrally connected together, and locking portion 97 is inserted through louver bearing unit main body 51, to thereby regulate bearing engagement portion 53 outward and prevent louver bearing unit 42 from coming out of louver main body 41 and retain louver bearing unit 42.

Wind direction adjuster 10 installed in an installation target unit of the interior member of an automobile is configured such that when valves 16 and 17 are placed in an open state as illustrated by imaginary lines in FIG. 1 and FIG. 2, and louver 13 is placed at a neutral position as illustrated in FIG. 4, in other words, case body 11 and louver 13 are placed substantially coaxially, air received from inlet 24 passes through channel 26 and flows from each ventilation opening 47 of louver 13 toward the front direction of a passenger.

Holding operation knob 19 and operating it in up-down and left-right directions cause louver 13 to turn as illustrated in FIG. 5 or FIG. 6. At this time, louver 13 can be turned in any given direction around turning center C using two axes orthogonal to each other, through turning of axial support body 12 with respect to bearing unit 28 of case body 11 and through turning of louver bearing unit 42 with respect to axial support body 12 illustrated in FIG. 1. During this operation, receiving body 56 coupled with operation knob 19 turns together with louver 13, and since the front end (elastic body 67) of ball unit 64 located at the front end of shaft 55 held to bearing unit 28 of case body 11 is pressed against sliding surface 76 of receiving unit 74 at the rear of receiving body 56 by an urging force of coil spring 57, the sliding resistance between the surface of ball unit 64 (elastic body 67) and sliding surface 76 is controlled to a substantially constant level by the urging force of coil spring 57 and louver 13 can turn with an appropriate operation load. Note that the turning angle of louver 13 is regulated by stoppers 68 provided so as to protrude from ball unit 64 coming into contact with regulating surface 77 in receiving unit 74. Thus, while louver 13 is turned, the central axis of louver 13 moves along the direction crossing the central axis of case body 11, and air flows along the central axis of louver 13 in a direction inclined with respect to the front direction of the passenger from each ventilation opening 47.

Furthermore, when the user holds operation knob 19 and turns operation knob 19 in the circumferential direction with respect to louver 13, receiving body 56 that operates in conjunction with operation knob 19 turns in the circumferential direction as illustrated in FIG. 2. In receiving body 56, since ball unit 64 of shaft 55 is pressed against receiving unit 74 by coil spring 57, shaft 55 and valve gear 89 of drive unit 18 coupled with shaft 55 also turn in the circumferential direction. As a result, when gear tooth portion 93 of valve gear 89, and valves 16 and 17 that mesh with gear portions 85 and 86 turn around shaft portions 83 and 84 as indicated by a solid line in FIG. 2, and when valve main bodies 81 and 82 come into contact with valve receiving portion 29, channel 26 is closed and the air is no longer blown from ventilation opening 47 of louver 13 (fully closed state).

Thus, according to the present embodiment, ball unit 64 provided on the case body 11 side is urged by coil spring 57 to be pressed against receiving unit 74 provided on the louver 13 side, and it is thereby possible to appropriately set the sliding resistance between ball unit 64 which becomes a turning load of louver 13 and receiving unit 74 using coil spring 57. Therefore, there is little variation of turning load (torque) under the influence of dimensional accuracy of ball unit 64 and temperature (heat) or the like, and even when abrasion or the like occurs in at least one of ball unit 64 and receiving unit 74 due to an increase in the number of operations, it is possible to obtain a substantially constant turning load by causing coil spring 57 to press ball unit 64 against receiving unit 74, and moreover, it is possible to control the turning load at one point in whatever direction louver 13 is operated, thereby operate louver 13 with a substantially constant and stable operation load, providing an excellent operation feeling. That is, it is possible to secure an intended operation feeling regardless of the dimensional accuracy of ball unit 64 and receiving unit 74, the temperature, the number of operations or the operation direction or the like.

Furthermore, also when the operation load is adjusted, the operation load can be easily adjusted by adjusting the urging force of coil spring 57, providing a highly robust structure independent of dimensional accuracy.

The surface of ball unit 64 that slides over receiving unit 74 is formed of elastic body 67, and it is thereby possible to make more stable the sliding resistance between ball unit 64 which becomes a turning load of louver 13 and receiving unit 74 and operate louver 13 with more stable operation load. Moreover, it is possible to set an operation load by an urging force of coil spring 57 without improving the thickness uniformity of elastic body 67 more than necessary.

Since coil spring 57 presses valve gear 89 against gear portions 85 and 86 of valves 16 and 17, it is possible to simultaneously secure an operation load (turning direction torque) when operating operation knob 19 by turning it in the circumferential direction.

Figure 7:
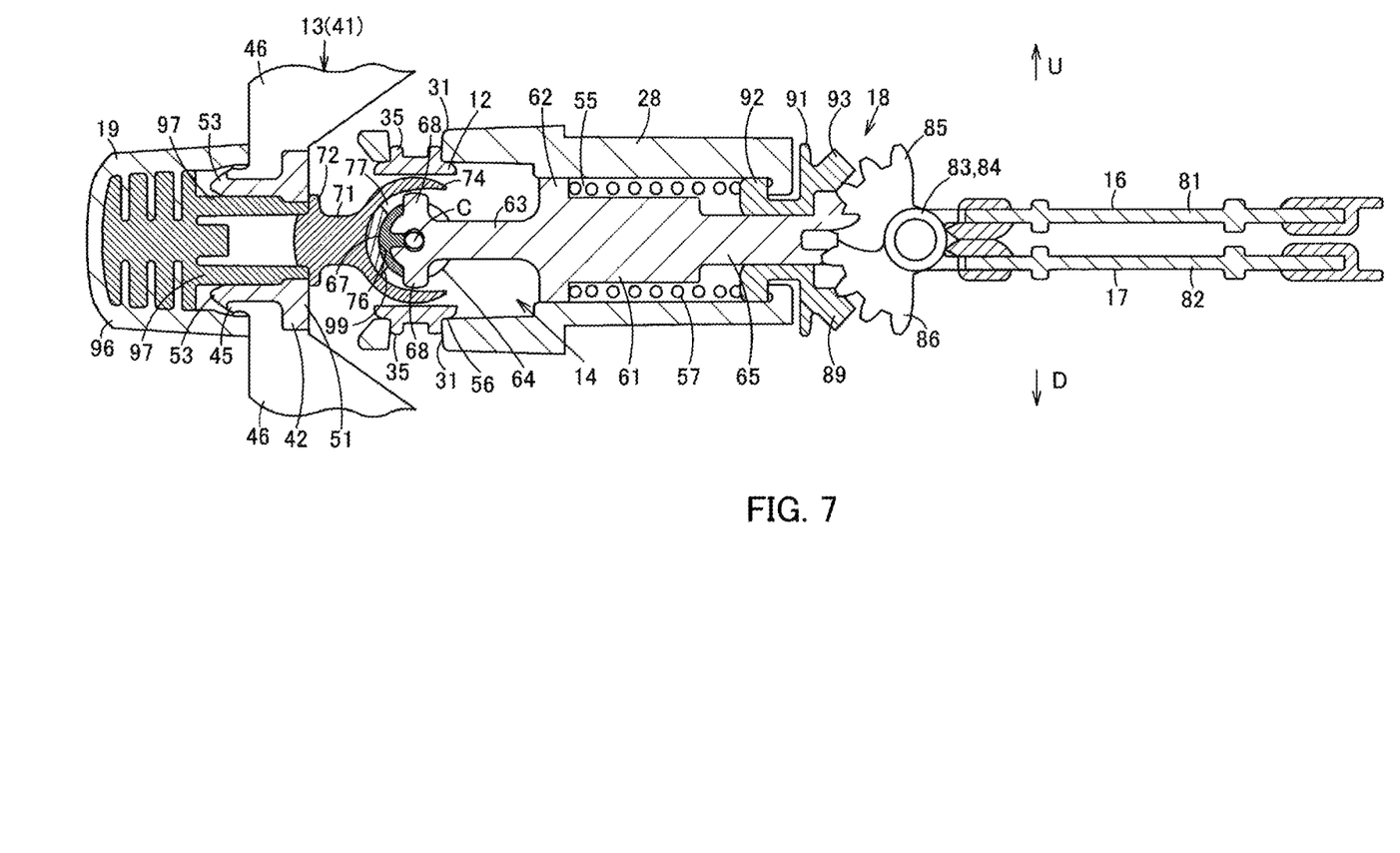
FIG. 7 is a partial cross-sectional view illustrating a wind direction adjuster according to a second embodiment of the present invention.

Note that, in the above-described first embodiment, it is also possible to set elastic body 99 in receiving unit 74 as in the case of the second embodiment illustrated in FIG. 7, for example. At this time, it is preferable to use a material having a counterforce such as elastomer or silicone rubber for elastic body 99 as in the case of elastic body 67. Elastic body 99 is bent into a spherical shape so as to form sliding surface 76, located on the front in receiving unit 74 and made to slide over the surface of ball unit 64. As a result, it is possible to bring about operational effects similar to those obtained in the above-described first embodiment.

Moreover, a configuration may also be adopted in which elastic bodies 67 and 99 are simultaneously used. Therefore, it is possible to set an appropriate operation load using the elastic body for at least one of ball unit 64 and receiving unit 74.

In each of the above-described embodiments, ball unit 64 is set on the side of case body 11 via shaft 55 while receiving unit 74 is set on the side of louver 13 via receiving body 56, but ball unit 64 may be set on the louver 13 side while receiving unit 74 may be set on the side of case body 11. In this case, coil spring 57 may be configured to urge so as to press receiving unit 74 toward ball unit 64. In this case, operational effects similar to those obtained in the above-described embodiments can be brought about.

Valves 16 and 17 are not mandatory components and a separate component may be applied to open and close channel 26.

Wind direction adjuster 10 may be used not only for vehicles but also for adjusting wind directions of any given air conditioner, for example.

INDUSTRIAL APPLICABILITY

The present invention is suitable for use as a wind direction adjuster for air conditioning in an automobile, for example.

REFERENCE SIGNS LIST

10 Wind direction adjuster
11 Case body
12 Axial support body
13 Louver
14 Load setting unit
57 Coil spring serving as urging unit
64 Ball unit serving as turning unit
67, 99 Elastic body
74 Receiving unit

The invention claimed is:

1. A wind direction adjuster comprising:
a cylindrical case body;
an axial support body axially supported to the case body turnably by a first shaft supporting unit so as to have a first axis along a first direction crossing an axial direction of the case body;
a louver axially supported to the axial support body turnably by a second shaft supporting unit so as to have a second axis along a second direction crossing both the first direction and the axial direction of the case body; and
a turning load controller that sets a turning load of the louver,
wherein the turning load controller comprises:
a ball unit provided in one of the case body and the louver, the ball unit having at least a part of a spherical shape;
a receiving unit provided in the other one of the case body and the louver, the receiving unit having a recessed spherical surface along the spherical shape of the ball unit, and the receiving unit being configured to slidably receive the ball unit on the recessed spherical surface; and an urging unit configured to urge one of the ball unit and the receiving unit to be pressed against the other, wherein the first shaft supporting unit comprises:
   a first bearing unit provided in one of the axial support body and the case body so as to have a first bearing axis corresponding to the first axis; and
   a first turning shaft provided in the other one of the axial support body and the case body so as to being supported by the first bearing unit, wherein the second shaft supporting unit comprises:
   a second bearing unit provided in one of the axial support body and the louver so as to have a second bearing axis corresponding to the second axis; and
   a second turning shaft provided in the other one of the axial support body and the louver so as to being supported by the second bearing unit, and wherein the first bearing unit and the second bearing unit are arranged such that the first bearing axis and the second bearing axis intersect with each other, and that an intersection point of the first bearing axis and the second bearing axis constitutes a turning center of the louver, a center of the spherical shape of the ball unit, and a center of the recessed spherical surface of the receiving unit.

2. The wind direction adjuster according to claim 1, wherein, in at least any one of the ball unit and the receiving unit, a position where the ball unit and the receiving unit slide over each other is formed using an elastic body.

* * * * *